United States Patent [19]

Schalk

[11] Patent Number: 5,205,539

[45] Date of Patent: Apr. 27, 1993

[54] DIAPHRAGM VALVE

[75] Inventor: Adelbert Schalk, Wutöschingen-Horheim, Fed. Rep. of Germany

[73] Assignee: Georg Fischer Rohrleitungssysteme AG, Schaffhausen, Switzerland

[21] Appl. No.: 893,136

[22] Filed: Jun. 3, 1992

[30] Foreign Application Priority Data

Jun. 7, 1991 [CH] Switzerland .................. 01712/91

[51] Int. Cl.⁵ .................... F16K 7/12; F16K 27/00
[52] U.S. Cl. ................................. 251/331; 251/367; 251/368
[58] Field of Search ............... 251/331, 367, 368, 337; 137/884

[56] References Cited

U.S. PATENT DOCUMENTS 3,521,674  7/1970  Dodson et al. ............. 251/367 X
4,304,257  12/1981  Webster .................... 137/884 X Primary Examiner—Arnold Rosenthal
Attorney, Agent, or Firm—Anderson Kill Olick & Oshinsky

[57] ABSTRACT

A diaphragm valve is described which comprises a lower housing portion and a upper housing portion which are clamped together by a fastening device. An elastomeric diaphragm is located between the lower housing portion and the upper housing portion. A compression spring is arranged between either the lower housing portion or the upper housing portion and an element of the fastening device.

39 Claims, 1 Drawing Sheet

DIAPHRAGM VALVE

FIELD OF THE INVENTION

The present invention relates to a diaphragm valve which comprises a lower housing portion which is constructed of a plastic material and which further comprises a passage channel for a medium and an upper housing portion which is also constructed of a plastic material and a diaphragm which is clamped between the housing portions by means of a fastening device. A pre-stressed compression spring is utilized and arranged adjacent each fastening device whereby the two housing portions are clamped together by a pre-determined force.

BACKGROUND OF THE INVENTION

Diaphragm valves are known which are constructed from plastic materials, see for example CH-PS 532738, which comprise housing parts which are also constructed from plastic materials and having an elastomeric diaphragm lying thereinbetween. The housing parts are fastened together by means of metallic bolts.

In pipeline systems of high purity design which are, for example, utilized in the chemical industry in applications where the temperature of the medium is approximately 20° C., it is usual to sterilize the pipeline systems periodically with superheated steam at a temperature above 120° C. All of the components and parts utilized in the system and which are in contact with the medium are heated to this high temperature.

Due to the coefficients of thermal expansion of the metal and the plastics parts, which typically differ by a factor greater than 10, the extension or elongation of the components or parts of the system must be absorbed by the most pliable component of the system, namely, an elastomeric diaphragm which is additionally compressed due to the heating.

Upon termination of the sterilization process, the system once again operates at its normal temperature. The elastomeric diaphragm of the prior art systems, however, usually retains a residual deformation due to its material composition. In this manner, the diaphragm which has been pressed together at its attachment points will not expand to its original form and thickness after cooling.

In this manner, the valve, which is typically sealed tightly up to a pressure of 10 bar, can spring leaks towards the exterior of the system at a lower medium pressure. This tendency to spring leaks requires the re-tightening of the attachment bolts utilized in the system. Further, through the increasingly more pronounced deformation of the diaphragm, its elastomeric texture is damaged and therefore, its useful life is correspondingly reduced.

SUMMARY OF THE INVENTION

The diaphragm valve of the present invention comprises a lower housing portion constructed of a plastic material and which further comprises a passage channel for a medium and an upper housing portion which is also constructed of a plastic material and a diaphragm which is clamped between the housing portions by means of a fastening device such as a bolt connection. A pre-stressed compression spring is utilized and arranged at each fastening device whereby the two housing portions are clamped together by a pre-determined force.

In the diaphragm valve of the present invention, the tightness of the seal is assured despite large variations in the temperature of the medium. Further, the compression spring utilized absorbs increases in length of the plastic components or parts so as to prevent the increases in length from being passed on to an elastomeric diaphragm. By using a spiral compression spring, having a rectangular winding cross-section, it is possible to assure a required pre-stressing force which corresponds to the medium pressure for a defined space condition for the diameter and yet provide an acceptable spring length. Further, an excessive increase in force in association with temperature, can be avoided so that no permanent damage can occur to the diaphragm.

Accordingly, it is an object of the present invention to provide a diaphragm valve wherein the tightness of the seal is assured despite large changes in the temperature of the medium which may occur, for instance, in heated sterilization cycles and which diahragm has a longer useful life.

It is another object of the present invention to provide a diaphragm valve wherein the changes in length at increasing temperatures of the plastic components or parts are absorbed by a compression spring rather than an elastomeric diaphragm.

It is a further object of the present invention to provide a diaphragm valve wherein a spiral compression spring having a rectangular winding cross-section is utilized so as to assure a required pre-stressing force corresponding to the medium pressure for the defined space conditions of the diameter and having an acceptable spring length and further so that an excessive increase in force with temperature can be avoided so that no permanent damage to the diaphragm can occur.

Other objects and advantages of the present invention will be made apparent to those persons skilled in the art upon a review of the Description of the Preferred Embodiment taken in conjunction with the Drawing which follows.

DETAILED DESCRIPTION OF THE PREFERRED EMBODIMENT

Figure 1:
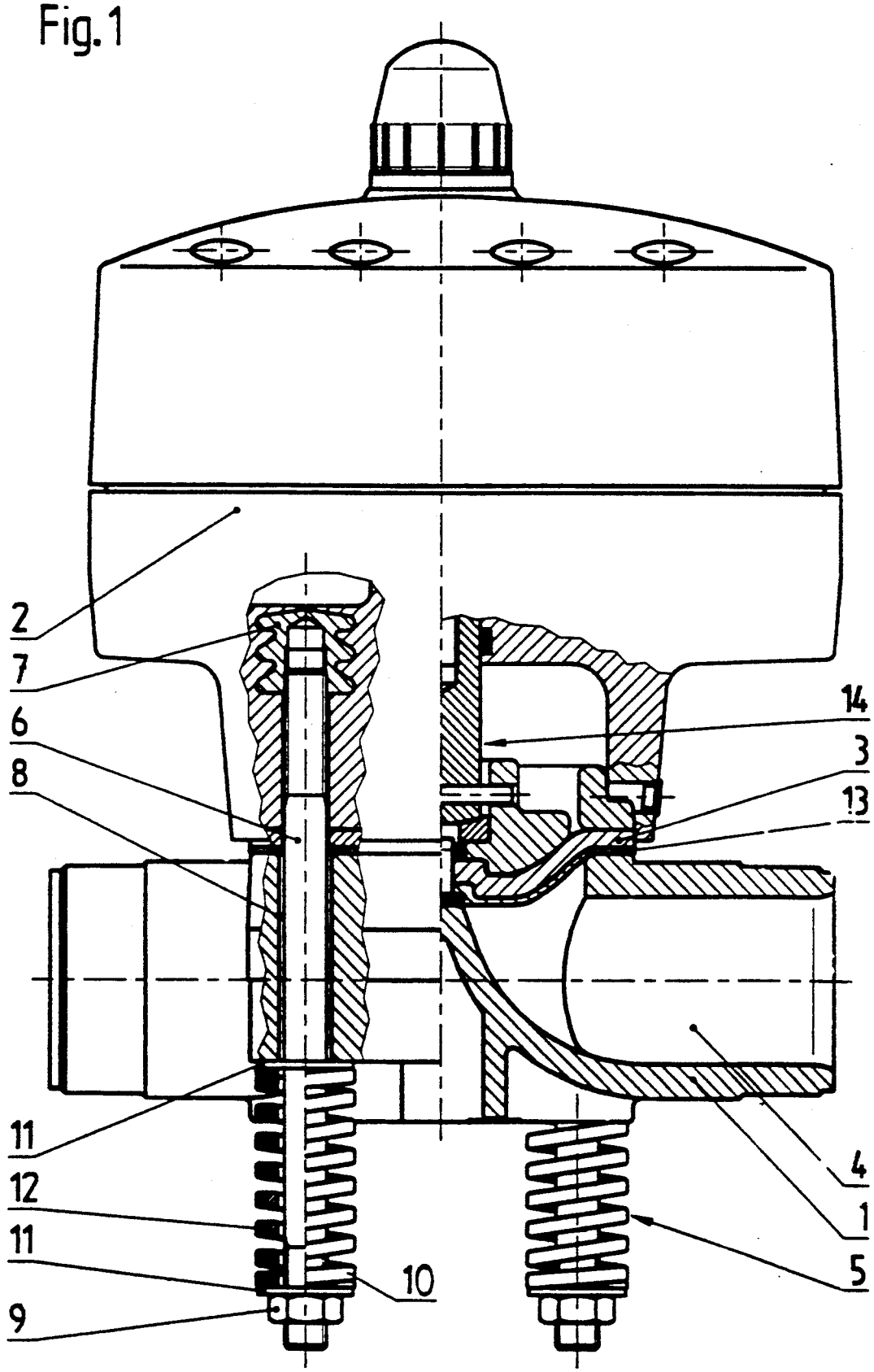
FIG. 1 illustrates the diaphragm valve of the present invention in a front view perspective.

FIG. 1 illustrates the diaphragm valve which is the subject of the present invention, and which is denoted generally by the reference numeral 100. The diaphragm valve 100 comprises a lower housing portion 1 which contains a passage channel 4, which is a channel for a medium which flows through the diaphragm valve 100, and an upper housing portion 2. Both the lower and upper housing portions 1 and 2, respectively, are preferably constructed of a plastic material, wherein the lower housing portion 1, depending upon the type of medium flowing therethrough, is constructed of polypropylene, polyvinylfluoride or a similar plastic material.

The upper housing portion 2 contains an actuation device 14 which is configured as a pneumatic actuation drive and is preferably constructed of polypropylene or of a similar plastic material.

The diaphragm valve 100 also comprises an actuation device 14, shown in FIG. 1, which can be a manually actuatable adjustment spindle or an electro-motor actuation drive.

For high purity designs or for aggressive media, a diaphragm combination, which consists of a diaphragm 13 which is preferably made from polytetrafluoroethylene, which is in contact with the medium, and the diaphragm 3, arranged behind diaphragm 13, which is preferably made from an elastomer, is tightly clamped between the lower and upper housing portions, 1 and 2, respectively.

Preferably, only one elastomeric diaphragm is required if the durability in the presence of the medium is assured.

A fastening device 5, which is preferably a bolt connection, is utilized in the diaphragm valve 100 and preferably comprises four metallic threaded bolts 6, which are tightly screwed with one end into a metallic threaded part which is arranged in the upper housing portion 2 and which extends through a bore 8 in the lower housing portion 1.

A nut 9 is threaded upon the end of a threaded bolt 6, to the end of the bolt 6 opposite the upper housing portion 2. A spiral compression spring 10, along with one interposed washer 11, is arranged between the lower housing portion 1 and the nut 9.

The bolt connection 5 can also consist of a screw having a screw head and which is threaded into the upper housing portion 2, wherein the spiral compression spring 10 is arranged between the lower housing portion 1 and the screw head.

It is also possible to screw the threaded bolt 6 or a screw into the bottom housing portion 1. In this embodiment, the compression spring 10 is preferably arranged between the nut 9 or the screw head and the upper housing portion 2.

The compression springs 10, may be of a spiral nature and may have a rectangular winding cross-section 12. Further, the compression spring 10 may be comprised of chromium silicon steel.

The compression springs 10 are pre-tensioned to a preset spring force during the assembly of the diaphragm valve 100 by turning the nut 9 or the screw by means of a torque wrench so that the force of all four springs is greater than 1.5 times the force generated by the operational pressure of the medium which may, for instance, be the sum of 10 bar and the force produced by an actuation device 14 upon the lower housing portion 1.

The spiral compression spring 10 has a spring constant denoted by the reference letter c which is defined by equation (1) below:

$$c = \frac{\Delta F}{\Delta L} \text{ (N/mm)} \quad (1)$$

wherein $\Delta F$ is a spring force difference, and $\Delta L$ is the length of spring travel due to heating.

When the housing portions 1 and 2 expand due to the heating of the medium through a temperature difference of 100° C., which change usually takes place from the temperature range 20° C. to 120° C., a set-up spring force increases by a maximum of 20%.

For a diaphragm valve 100 having a nominal width DN equal to 40 mm, an operational pressure of 10 bar at an operating temperature of 20° C., and a superheated steam temperature for sterilizing the valves of 120° C., the compression spring 10 has the following typical spring characteristic values which are tabulated in Table 1.

TABLE 1

| Spring Characteristics | Symbol | Typical Value |
|---|---|---|
| Spring Diameter | D/d | = 32/16 mm |
| Spring length - unstressed = | Lo | = 38 mm |
| Spring constant | C | = 520 N/mm |
| Spring prestressing force | FI | = 4680 N |
| Spring travel - prestress | LI | = 9 mm |
| Spring travel due to heating | $\Delta L = L2 - L1$ | = 1.5 mm |
| Spring force at L2 | F2 | = 5460 N |
| Spring force - difference | $\Delta F$ | = 780N = 17% of F1 |

The required spring forces can be achieved, without causing a permanent change to the diaphragm at or during a temperature increase of the medium of approximately 100° C., with spiral compression springs having a rectangular winding cross-section for the defined space conditions for the diameter while still providing an acceptable spring length or constructional height.

While the diaphragm valve of the present invention has been described in a preferred embodiment, such description is meant to be merely illustrative of the present invention and is not to be construed as a limitation thereof. Therefore, the present invention may encompass any and all modification and/or variations of the present invention the scope of which is limited only by the claims which follow.

What is claimed is:

1. A diaphragm valve which comprises:
   a lower housing portion which is constructed of a plastic material and which further comprises a passage channel for passage of a medium;
   an upper housing portion which is constructed of a plastic material;
   a diaphragm wherein said diaphragm is located between said lower housing portion and said upper housing portion;
   a fastening device for connecting said lower housing portion to said upper housing portion; and
   a compression spring which is pre-stressed and which is further arranged adjacent to each fastening device;
   wherein said lower housing portion and said upper housing portion are clamped together by said fastening device with a pre-determined force and further wherein said diaphragm is supported between said lower housing portion and said upper housing portion.

2. The diaphragm valve of claim 1, wherein said compression spring is a spiral compression spring.

3. The diaphragm valve of claim 2, wherein said compression spring is characterized by a rectangular winding cross-section and a spring constant.

4. The diaphragm valve of claim 1, wherein said compression spring is further characterized by a spring force which increases by a maximum of 20% in response to the elongation of said lower housing portion and said upper housing portion upon the increase in temperature of the medium through a temperature difference of 100° C.

5. The diaphragm valve of claim 2, wherein said compression spring is further characterized by a spring force which increases by a maximum of 20% in response to the elongation of said lower housing portion and said upper housing portion upon the increase in temperature of the medium through a temperature difference of 100° C.

6. The diaphragm valve of claim 3, wherein said compression spring is further characterized by a spring force which increases by a maximum of 20% in response to the elongation of said lower housing portion and said upper housing portion upon the increase in temperature of the medium through a temperature difference of 100° C.

7. The diaphragm valve of claim 1, wherein said compression spring is fabricated from a chromium silicon steel.

8. The diaphragm valve of claim 2, wherein said compression spring is fabricated from a chromium silicon steel.

9. The diaphragm valve of claim 3, wherein said compression spring is fabricated from a chromium silicon steel.

10. The diaphragm valve of claim 4, wherein said compression spring is fabricated from a chromium silicon steel.

11. The diaphragm valve of claim 5, wherein said compression spring is fabricated from a chromium silicon steel.

12. The diaphragm valve of claim 6, wherein said compression spring is fabricated from a chromium silicon steel.

13. The diaphragm valve of claim 1, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

14. The diaphragm valve of claim 2, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

15. The diaphragm valve of claim 3, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

16. The diaphragm valve of claim 4, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

17. The diaphragm valve of claim 5, wherein said fastening device comprises: a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

18. The diaphragm valve of claim 6, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

19. The diaphragm valve of claim 7, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

20. The diaphragm valve of claim 8, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

21. The diaphragm valve of claim 9, wherein said fastening device comprises:
   a threaded bolt which is tightly screwed with one end into one of said lower housing portion and said upper housing portion; and
   a nut which is fastened to said threaded bolt at the end of said threaded bolt opposite the one of said lower housing portion and said upper housing portion;
   and further wherein said compression spring is located between said nut and one of said lower housing portion and said upper housing portion.

22. The diaphragm valve of claim 10, wherein said fastening device comprises:

a threaded bolt which is tightly screwed with one end into one of said lower housing portion and said upper housing portion; and a nut which is fastened to said threaded bolt at the end of said threaded bolt opposite the one of said lower housing portion and said upper housing portion;

and further wherein said compression spring is located between said nut and one of said lower housing portion and said upper housing portion.

23. The diaphragm valve of claim 11, wherein said fastening device comprises:

a threaded bolt which is tightly screwed with one end into one of said lower housing portion and said upper housing portion; and a nut which is fastened to said threaded bolt at the end of said threaded bolt opposite the one of said lower housing portion and said upper housing portion;

and further wherein said compression spring is located between said nut and one of said lower housing portion and said upper housing portion.

24. The diaphragm valve of claim 12, wherein said fastening device comprises:

a threaded bolt which is tightly screwed with one end into one of said lower housing portion and said upper housing portion; and a nut which is fastened to said threaded bolt at the end of said threaded bolt opposite the one of said lower housing portion and said upper housing portion;

and further wherein said compression spring is located between said nut and one of said lower housing portion and said upper housing portion.

25. The diaphragm valve of claim 1, wherein said fastening device comprises a screw having a screw head wherein said compression spring is arranged between said screw head and one of said lower housing portion and said upper housing portion.

26. The diaphragm valve of claim 2, wherein said fastening device comprises a screw having a screw head wherein said compression spring is arranged between said screw head and one of said lower housing portion and said upper housing portion.

27. The diaphragm valve of claim 3, wherein said fastening device comprises a screw having a screw head wherein said compression spring is arranged between said screw head and one of said lower housing portion and said upper housing portion.

28. The diaphragm valve of claim 4, wherein said fastening device comprises a screw having a screw head wherein said compression spring is arranged between said screw head and one of said lower housing portion and said upper housing portion.

29. The diaphragm valve of claim 5, wherein said fastening device comprises a screw having a screw head wherein said compression spring is arranged between said screw head and one of said lower housing portion and said upper housing portion.

30. The diaphragm valve of claim 6, wherein said fastening device comprises a screw having a screw head wherein said compression spring is arranged between said screw head and one of said lower housing portion and said upper housing portion.

31. The diaphragm valve of claim 7, wherein said fastening device comprises a screw having a screw head wherein said compression spring is arranged between said screw head and one of said lower housing portion and said upper housing portion.

32. The diaphragm valve of claim 8, wherein said fastening device comprises a screw having a screw head wherein said compression spring is arranged between said screw head and one of said lower housing portion and said upper housing portion.

33. The diaphragm valve of claim 9, wherein said fastening device comprises a screw having a screw head wherein said compression spring is arranged between said screw head and one of said lower housing portion and said upper housing portion.

34. The diaphragm valve of claim 10, wherein said fastening device comprises a screw having a screw head wherein said compression spring is arranged between said screw head and one of said lower housing portion and said upper housing portion.

35. The diaphragm valve of claim 11, wherein said fastening device comprises a screw having a screw head wherein said compression spring is arranged between said screw head and one of said lower housing portion and said upper housing portion.

36. The diaphragm valve of claim 12, wherein said fastening device comprises a screw having a screw head wherein said compression spring is arranged between said screw head and one of said lower housing portion and said upper housing portion.

37. The diaphragm valve of claim 1, wherein said compression spring is characterized by a prestressing force which is adjustable by turning said fastening device by means of a torque wrench.

38. The diaphragm valve of claim 37, wherein the compression spring has a prestressing force wherein a sum of the prestressing force of all compression springs utilized is greater than the force produced by the medium pressure and an actuation device upon said lower housing by a factor of 1.5 at an operating temperature.

39. The diaphragm valve of claim 1, wherein said diaphragm comprises:

a first diaphragm element which faces a flow medium and which is constructed of polytetrafluoroethylene; and a second diaphragm element which is arranged behind said first diaphragm element and which is constructed of an elastomer;

wherein said first diaphragm element and said second diaphragm element form a two layer diaphragm.

* * * * *